United States Patent
Peng

(10) Patent No.: US 9,664,941 B2
(45) Date of Patent: May 30, 2017

(54) COLOR FILTER SUBSTRATE AND CURVED LIQUID CRYSTAL DISPLAY PANEL COMPRISING SAME

(71) Applicant: Wuhan China Star Optoelectronics Technology Co., Ltd., Wuhan (CN)

(72) Inventor: Haibo Peng, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 86 days.

(21) Appl. No.: 14/777,520

(22) PCT Filed: Jun. 25, 2015

(86) PCT No.: PCT/CN2015/082267
§ 371 (c)(1),
(2) Date: Sep. 16, 2015

(87) PCT Pub. No.: WO2016/192152
PCT Pub. Date: Dec. 8, 2016

(65) Prior Publication Data
US 2017/0090242 A1    Mar. 30, 2017

(30) Foreign Application Priority Data

Jun. 3, 2015  (CN) .......................... 2015 1 0298885

(51) Int. Cl.
*G02F 1/1333* (2006.01)
*G02F 1/1335* (2006.01)
(Continued)

(52) U.S. Cl.
CPC ...... *G02F 1/133512* (2013.01); *G02F 1/1368* (2013.01); *G02F 1/13394* (2013.01);
(Continued)

(58) Field of Classification Search
None
See application file for complete search history.

(56) References Cited

U.S. PATENT DOCUMENTS

2009/0066861 A1* 3/2009 Rho ..................... G02F 1/13338
349/12
2013/0342795 A1* 12/2013 Park .................. G02F 1/133512
349/110

* cited by examiner

*Primary Examiner* — Richard Kim
(74) *Attorney, Agent, or Firm* — Leong C. Lei

(57) ABSTRACT

The present invention provides a CF substrate and a curved liquid crystal display panel including the CF substrate. A black matrix is provided on the CF substrate and includes a plurality of expanded sections respectively corresponding to a plurality of main photo spacers. The expanded sections that are located in an edge area of the CF substrate have an area that is greater than an area of the expanded sections that are located in a central area of the CF substrate in order to ensure the distance of the main photo spacers located in the edge area from the pixel open area is increased to effectively prevent the main photo spacers located in the edge area from being twisted with the panel and shifted into the pixel open area during a curving process of a curved liquid crystal display panel to induce undesired situations of light leakage and poor displaying of the display device. In addition, the light-shielding strips of the black matrix that are located in the edge area is arranged to have a width that is less than that of the light-shielding strips of the black matrix located in the central area in order to provide pixel zones of the edge area and the central area of the CF substrate with the same area, making the aperture ratios of the central area and the edge area of a curved liquid crystal display panel identical to thereby improving the displaying quality of the liquid crystal display panel.

10 Claims, 3 Drawing Sheets

(51) Int. Cl.
   *G02F 1/1368*   (2006.01)
   *G02F 1/1339*   (2006.01)
(52) U.S. Cl.
   CPC .................. *G02F 1/133514* (2013.01); *G02F 2001/13396* (2013.01)

COLOR FILTER SUBSTRATE AND CURVED LIQUID CRYSTAL DISPLAY PANEL COMPRISING SAME

BACKGROUND OF THE INVENTION

1. Field of the Invention

The present invention relates to the field of liquid crystal display, and in particular to a color filter substrate and a curved liquid crystal display panel comprising the color filter substrate.

2. The Related Arts

The operation principle of a liquid crystal display panel is that with liquid crystal molecules interposed between two parallel glass substrates, a driving voltage is applied to the two glass substrates to control rotation of the liquid crystal molecules so as to refract out light emitting from a backlight module to generate an image. A liquid crystal display panel generally comprises: a thin-film transistor (TFT) array substrate, a color filter (CF) substrate laminated on the TFT array substrate, and a liquid crystal layer interposed between the TFT array substrate and the CF substrate.

Compared to a traditional flat display screen, a curved screen may, on the one hand, reduce the amount of spaced occupied and, on the other hand, display an effect of surrounding image thereby providing a better displaying effect than that of the flat screen. Thus, the applications of the curved screen are getting wider and wider. Heretofore, designs of curved liquid crystal displays proposed in the industry are generally following designs and manufactures of flat displays, which are then subject to curving by mechanical means.

FIG. 1 is a schematic view illustrating the structure of a conventional flat liquid crystal display panel. The flat liquid crystal display panel comprises a TFT substrate 100 and a CF substrate 200 opposite to the TFT substrate 100. A plurality of main photo spacers 310 and a plurality of sub photo spacers 330 are provided on the CF substrate 200. The plurality of main photo spacers 310 each has a distal end connected to the TFT substrate 100 so as to support a thickness between the TFT substrate 100 and the CF substrate 200. FIG. 2 is a schematic view illustrating a curved liquid crystal display panel that is formed by curving the flat liquid crystal display panel of FIG. 1. As shown in FIGS. 1 and 2, during the curving process of the flat liquid crystal display panel, the main photo spacer 310 on an edge of the CF substrate 200 is subjected to a greater amount of twisting and shifting and may thus reach into an aperture area of a pixel of the curved liquid crystal display panel so as to make the curved liquid crystal display panel so made generating undesired situations of for example light leakage thereby affecting product yield ratio.

SUMMARY OF THE INVENTION

An object of the present invention is to provide a color filter (CF) substrate, wherein a primary photo spacer located at an edge area of the CF substrate has an increased distance from a pixel open area so as to effectively prevent main photo spacers theta are located in an edge area from being twisted with the CF substrate and shifted into a pixel open area during a curving process of the CF substrate to induce undesired situations of light leakage and poor displaying of a display device.

Another object of the present invention is to provide a curved liquid crystal display panel that comprises the above-described CF substrate to eliminate undesired situations of light leakage and poor displaying and to make the aperture ratio consistent for various areas thereby achieving better displaying quality.

The present invention provides a CF substrate, which comprises a transparent substrate, a plurality of pixel zones arranged on the transparent substrate in a manner of being spaced from each other, a black matrix arranged on the transparent substrate and located between the plurality of pixel zones, and a plurality of main photo spacers and a plurality of sub photo spacers arranged on the black matrix;

the black matrix comprising a plurality of longitudinally-arranged and laterally-arranged light-shielding strips and a plurality of expanded sections formed on two sides of the light-shielding strips, the plurality of main photo spacers and the plurality of sub photo spacers being arranged in a central area of light-shielding strips to be spaced from each other in an extension direction of the light-shielding strip, the plurality of expanded sections being arranged on the two sides of the light-shielding strips to respectively correspond to the plurality of main photo spacers, the expanded sections located in an edge area of the CF substrate having an area that is greater than an area of the expanded sections located in the central area of the CF substrate.

The expanded sections each comprise an arc edge, the arc edges defining boundaries of the expanded sections of the black matrix and the pixel zones.

A distance of the main photo spacers that are located in the central area of the CF substrate from the arc edges of the expanded sections is 10 μm and a distance of the main photo spacers located in the edge area of the CF substrate from the arc edges of the expanded sections is greater than 10 μm.

The distance of the main photo spacers located in the edge area of the CF substrate from the arc edges of the expanded sections is 12 μm, 14 μm, or 16 μm.

The light-shielding strips of the black matrix that are located in the edge area of the CF substrate have a width that is less than a width of the light-shielding strips of the black matrix that are located in the central area of the CF substrate.

The present invention also provides a curved liquid crystal display panel, which comprises a TFT array substrate, a CF substrate opposite to the TFT array substrate, an enclosure resin connecting and sealing between the TFT array substrate and the CF substrate, and a liquid crystal layer arranged between the TFT array substrate and the CF substrate;

the CF substrate comprising a transparent substrate, a plurality of pixel zones arranged on the transparent substrate in a manner of being spaced from each other, a black matrix arranged on the transparent substrate and located between the plurality of pixel zones, and a plurality of main photo spacers and a plurality of sub photo spacers arranged on the black matrix;

the black matrix comprising a plurality of longitudinally-arranged and laterally-arranged light-shielding strips and a plurality of expanded sections formed on two sides of the light-shielding strips, the plurality of main photo spacers and the plurality of sub photo spacers being arranged in a central area of light-shielding strips to be spaced from each other in an extension direction of the light-shielding strip, the plurality of expanded sections being arranged on the two sides of the light-shielding strips to respectively correspond to the plurality of main photo spacers, the expanded sections located in an edge area of the CF substrate having an area that is greater than an area of the expanded sections located in the central area of the CF substrate.

The expanded sections each comprise an arc edge, the arc edges defining boundaries of the expanded sections of the black matrix and the pixel zones.

A distance of the main photo spacers that are located in the central area of the CF substrate from the arc edges of the expanded sections is 10 μm and a distance of the main photo spacers located in the edge area of the CF substrate from the arc edges of the expanded sections is greater than 10 μm.

The distance of the main photo spacers located in the edge area of the CF substrate from the arc edges of the expanded sections is 12 μm, 14 μm, or 16 μm.

The light-shielding strips of the black matrix that are located in the edge area of the CF substrate have a width that is less than a width of the light-shielding strips of the black matrix that are located in the central area of the CF substrate.

The present invention further provides a curved liquid crystal display panel, which comprises a TFT array substrate, a CF substrate opposite to the TFT array substrate, an enclosure resin connecting and sealing between the TFT array substrate and the CF substrate, and a liquid crystal layer arranged between the TFT array substrate and the CF substrate;

the CF substrate comprising a transparent substrate, a plurality of pixel zones arranged on the transparent substrate in a manner of being spaced from each other, a black matrix arranged on the transparent substrate and located between the plurality of pixel zones, and a plurality of main photo spacers and a plurality of sub photo spacers arranged on the black matrix;

the black matrix comprising a plurality of longitudinally-arranged and laterally-arranged light-shielding strips and a plurality of expanded sections formed on two sides of the light-shielding strips, the plurality of main photo spacers and the plurality of sub photo spacers being arranged in a central area of light-shielding strips to be spaced from each other in an extension direction of the light-shielding strip, the plurality of expanded sections being arranged on the two sides of the light-shielding strips to respectively correspond to the plurality of main photo spacers, the expanded sections located in an edge area of the CF substrate having an area that is greater than an area of the expanded sections located in the central area of the CF substrate;

wherein the expanded sections each comprise an arc edge, the arc edges defining boundaries of the expanded sections of the black matrix and the pixel zones;

wherein a distance of the main photo spacers that are located in the central area of the CF substrate from the arc edges of the expanded sections is 10 μm and a distance of the main photo spacers located in the edge area of the CF substrate from the arc edges of the expanded sections is greater than 10 μm; and wherein the light-shielding strips of the black matrix that are located in the edge area of the CF substrate have a width that is less than a width of the light-shielding strips of the black matrix that are located in the central area of the CF substrate.

The efficacy of the present invention is that the present invention provides a CF substrate and a curved liquid crystal display panel comprising the CF substrate. The CF substrate is provided thereon with a black matrix that comprises a plurality of expanded sections respectively corresponding to a plurality of main photo spacers and the expanded sections that are located in an edge area of the CF substrate have an area that is greater than that of the expanded sections that are located in a central area of the CF substrate in order to ensure the distance of the main photo spacers located in the edge area from the pixel open area is increased to effectively prevent the main photo spacers located in the edge area from being twisted with the panel and shifted into the pixel open area during a curving process of a curved liquid crystal display panel to induce undesired situations of light leakage and poor displaying of the display device. In addition, the light-shielding strips of the black matrix that are located in the edge area is arranged to have a width that is less than that of the light-shielding strips of the black matrix located in the central area in order to provide pixel zones of the edge area and the central area of the CF substrate with the same area, making the aperture ratios of the central area and the edge area of a curved liquid crystal display panel identical to thereby improving the displaying quality of the liquid crystal display panel.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
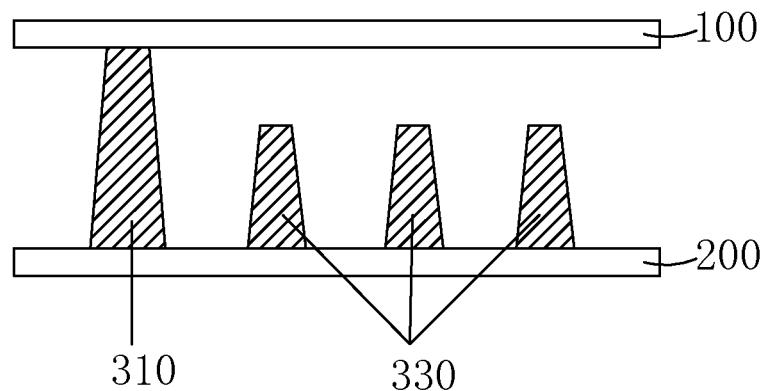
FIG. 1 is a schematic view showing the structure of a conventional flat liquid crystal display panel.
Figure 2:
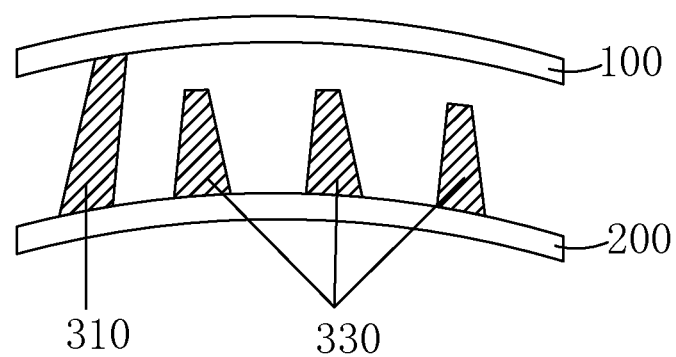
FIG. 2 is a schematic view showing the structure of a curved liquid crystal display panel formed by curving the flat liquid crystal display panel of FIG. 1.
Figure 3:
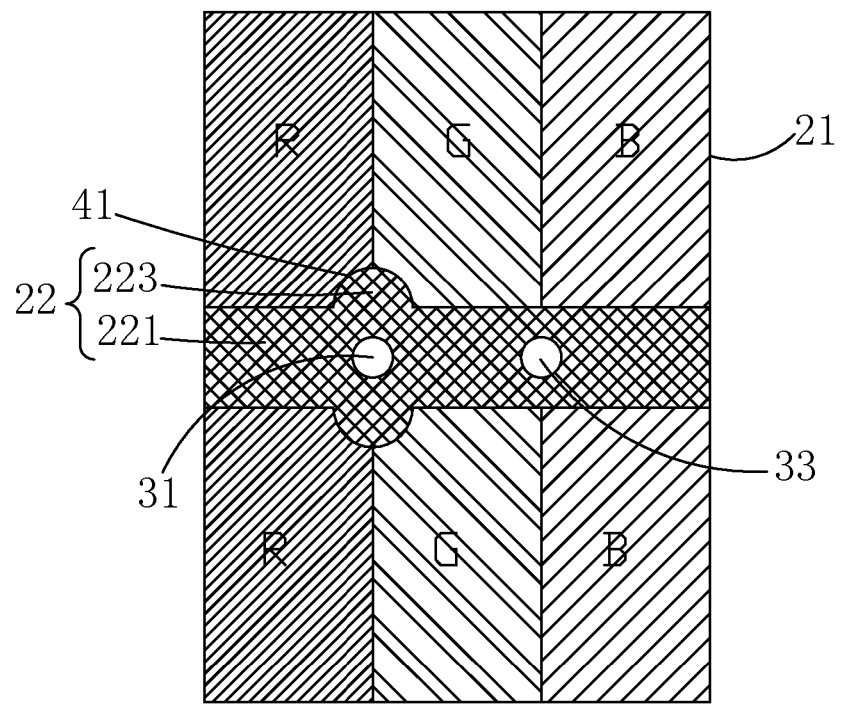
FIG. 3 is a schematic view showing a central area of a CF substrate according to the present invention.
Figure 4:
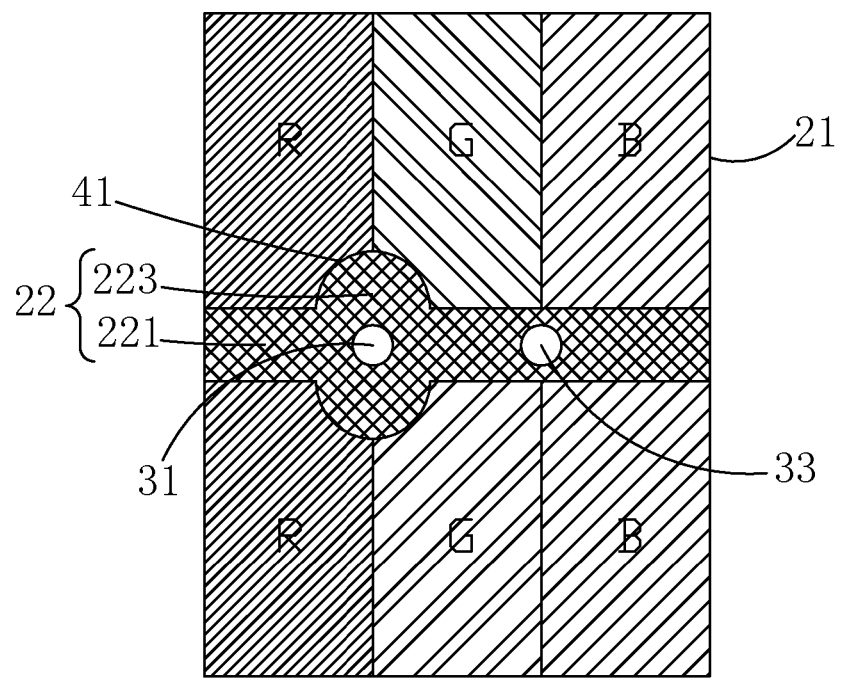
FIG. 4 is a schematic view showing an edge area of the CF substrate according to the present invention.
Figure 5:
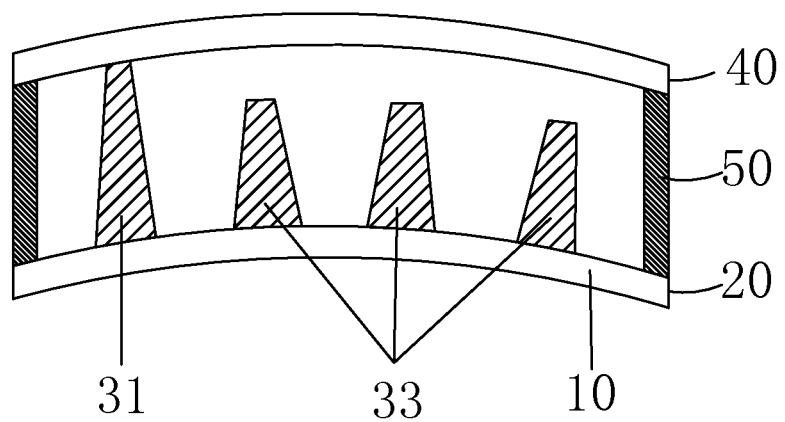
FIG. 5 is a schematic view showing the structure of a curved liquid crystal display panel according to the present invention.

Referring to FIGS. 3-5, firstly, the present invention provides a color filter (CF) substrate 20, which is used to manufacture a curved liquid crystal display panel. The CF substrate 20 comprises a transparent substrate 10, a plurality of pixel zones 21 arranged on the transparent substrate 10 in a manner of being spaced from each other, a black matrix 22 arranged on the transparent substrate 10 and located between the plurality of pixel zones 21, and a plurality of main photo spacers (PS) 31 and a plurality of sub photo spacers 33 arranged on the black matrix 22.

Specifically, each of the pixel zones 21 comprises three sub-pixel zones, which are respectively red (R), green (G), and blue (B) sub-pixel zones. The main photo spacers 31 have a height that is greater than a height of the sub photo spacers 33.

Specifically, the black matrix 22 comprises a plurality of longitudinally-arranged and laterally-arranged light-shielding strips 221 and a plurality of expanded sections 223 formed on two sides of the light-shielding strips 221. The plurality of main photo spacers 31 and the plurality of sub photo spacers 33 are arranged in a central area of light-shielding strips 221 to be spaced from each other in an extension direction of the light-shielding strip 221. The plurality of expanded sections 223 is arranged on the two sides of the light-shielding strips 221 to respectively correspond to the plurality of main photo spacers 31.

The present invention is structured to arrange the expanded sections 223 on the light-shielding strips 221 of the black matrix 22 at locations respectively corresponding to the main photo spacers 31 so that the main photo spacers 31 are each set at a predetermined distance from the pixel zone 21 to prevent the main photo spacers 31 from being shifted into the pixel zone 21.

Specifically, the expanded sections 223 that are located at different portions of the CF substrate 20 may have different areas. Preferably, the expanded sections 223 that are located in an edge area of the CF substrate 20 have an area that is greater than that of the expanded sections 223 located in a central area of the CF substrate 20, whereby the distance between a main photo spacer 31 located in an edge area of the CF substrate 20 and the pixel zone 21 is greater than the distance between a main photo spacer 31 located in the central area of the CF substrate 20 and the pixel zone 21.

Specifically, the expanded sections 223 each have an arc edge 41. The arc edge 41 defines a boundary between the expanded section 223 of the black matrix 22 and the pixel zone 21.

Preferably, the distance between the main photo spacer 31 located in the central area and the arc edge 41 of the expanded section 223 is 10 μm; and the distance between the main photo spacer 31 located in the edge area and the arc edge 41 of the expanded section 223 is greater than 10 μm and may specifically be 12 μm, 14 μm, or 16 μm.

Conventionally, a curved liquid crystal display panel is formed by curving a flat liquid crystal display panel by a predetermined angle. However, during the process of curving, since the edge area is subjected to an increased angle of twisting, the main photo spacer 31 that is located in the edge area of the CF substrate 20 undergoes an increased amount of shifting and may readily reach into the pixel zone 21 so as to cause undesired situations of light leakage or poor displaying of the curved liquid crystal display panel. The present invention provides an increased area for the expanded sections 223 located in the edge area of the CF substrate 20 so as to prevent the main photo spacer 31 located in the edge area from being shifted into the pixel zone 21 thereby effectively eliminating the undesired situations of light leakage and poor displaying of the curved liquid crystal display panel.

Further, since the expanded sections 223 located in the edge area of the CF substrate 20 have an area that is greater than that of the expanded sections 223 located in the central area of the CF substrate 20, so that the pixel zones 21 located in the edge area have an area that is smaller than that of the pixel zones 21 located in the central area, this making the pixel aperture ratio of the edge area of the liquid crystal display panel less than that of the central area. To overcome such a problem, the light-shielding strips 221 of the black matrix 22 that are located in the edge area of the CF substrate 20 are arranged to have a width that is less than that of the light-shielding strips 221 of the black matrix 22 that are located in the central area of the CF substrate 20 so as to ensure consistency of aperture ratio between the central area and the edge area of the liquid crystal display panel and thus improve the displaying quality of the liquid crystal display panel.

Referring to FIG. 5, with additional reference being had to FIGS. 3 and 4, the present invention also provides a curved liquid crystal display panel comprising the above-described CF substrate 20. The curved liquid crystal display panel comprises a thin-film transistor (TFT) array substrate 40, a CF substrate 20 opposite to the TFT array substrate 40, an enclosure resin 50 connecting and sealing between the TFT array substrate 40 and the CF substrate 20, and a liquid crystal layer (not shown) arranged between the TFT array substrate 40 and the CF substrate 20.

The CF substrate 20 comprises a transparent substrate 10, a plurality of pixel zones 21 arranged on the transparent substrate 10 in a manner of being spaced from each other, a black matrix 22 arranged on the transparent substrate 10 and located between the plurality of pixel zones 21, and a plurality of main photo spacers 31 and a plurality of sub photo spacers 33 arranged on the black matrix 22.

The main photo spacers 31 have a height that is greater than a height of the sub photo spacers 33. The plurality of main photo spacers 31 provided on the CF substrate 20 each has an opposite end connected to the TFT array substrate 40 in order to support a thickness between the TFT array substrate 40 and the CF substrate 20.

Specifically, each of the pixel zones 21 comprises three sub-pixel zones, which are respectively red (R), green (G), and blue (B) sub-pixel zones.

Specifically, the black matrix 22 comprises a plurality of longitudinally-arranged and laterally-arranged light-shielding strips 221 and a plurality of expanded sections 223 formed on two sides of the light-shielding strip 221. The plurality of main photo spacers 31 and the plurality of sub photo spacers 33 are arranged in a central area of light-shielding strips 221 to be spaced from each other in an extension direction of the light-shielding strip 221. The plurality of expanded sections 223 is arranged on the two sides of the light-shielding strip 221 to respectively correspond to the plurality of main photo spacers 31.

Specifically, the expanded sections 223 that are located at different portions of the CF substrate 20 may have different areas. Preferably, the expanded sections 223 that are located in an edge area of the CF substrate 20 have an area that is greater than that of the expanded sections 223 located in a central area of the CF substrate 20, whereby the distance between a main photo spacer 31 located in an edge area of the CF substrate 20 and the pixel zone 21 is greater than the distance between a main photo spacer 31 located in the central area of the CF substrate 20 and the pixel zone 21.

Specifically, the expanded sections 223 each have an arc edge 41. The arc edge 41 defines a boundary between the expanded section 223 of the black matrix 22 and the pixel zone 21.

Preferably, the distance between the main photo spacer 31 located in the central area of the CF substrate 20 and the arc edge 41 of the expanded section 223 is 10 μm; and the distance between the main photo spacer 31 located in the edge area of the CF substrate 20 and the arc edge 41 of the expanded section 223 is greater than 10 μm and may specifically be 12 μm, 14 μm, or 16 μm.

Preferably, the light-shielding strips 221 of the black matrix 22 that are located in the edge area of the CF substrate 20 have a width that is less than that of the light-shielding strips 221 of the black matrix 22 that are located in central area of the CF substrate 20 so as to ensure consistency of aperture ratio between the central area and the edge area of the curved liquid crystal display panel and thus improve the displaying quality of the liquid crystal display panel.

In summary, the present invention provides a CF substrate and a curved liquid crystal display panel comprising the CF substrate. The CF substrate is provided thereon with a black matrix that comprises a plurality of expanded sections respectively corresponding to a plurality of main photo spacers and the expanded sections that are located in an edge area of the CF substrate have an area that is greater than that of the expanded sections that are located in a central area of the CF substrate in order to ensure the distance of the main photo spacers located in the edge area from the pixel open area is increased to effectively prevent the main photo spacers located in the edge area from being twisted with the panel and shifted into the pixel open area during a curving process of a curved liquid crystal display panel to induce undesired situations of light leakage and poor displaying of the display device. In addition, the light-shielding strips of the black matrix that are located in the edge area is arranged to have a width that is less than that of the light-shielding strips of the black matrix located in the central area in order to provide pixel zones of the edge area and the central area of the CF substrate with the same area, making the aperture ratios of the central area and the edge area of a curved liquid crystal display panel identical to thereby improving the displaying quality of the liquid crystal display panel.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A color filter (CF) substrate, comprising a transparent substrate, a plurality of pixel zones arranged on the transparent substrate in a manner of being spaced from each other, a black matrix arranged on the transparent substrate and located between the plurality of pixel zones, and a plurality of main photo spacers and a plurality of sub photo spacers arranged on the black matrix;

the black matrix comprising a plurality of longitudinally-arranged and laterally-arranged light-shielding strips and a plurality of expanded sections formed on two sides of the light-shielding strips, the plurality of main photo spacers and the plurality of sub photo spacers being arranged in a central area of light-shielding strips to be spaced from each other in an extension direction of the light-shielding strip, the plurality of expanded sections being arranged on the two sides of the light-shielding strips to respectively correspond to the plurality of main photo spacers, the expanded sections located in an edge area of the CF substrate having an area that is less than an area of the expanded sections located in the central area of the CF substrate;

wherein the light-shielding strips of the black matrix that are located in the edge area of the CF substrate have a width that is less than a width of the light-shielding strips of the black matrix that are located in the central area of the CF substrate.

2. The CF substrate as claimed in claim 1, wherein the expanded sections each comprise an arc edge, the arc edges defining boundaries of the expanded sections of the black matrix and the pixel zones.

3. The CF substrate as claimed in claim 2, wherein a distance of the main photo spacers that are located in the central area of the CF substrate from the arc edges of the expanded sections is 10 µm and a distance of the main photo spacers located in the edge area of the CF substrate from the arc edges of the expanded sections is greater than 10 µm.

4. The CF substrate as claimed in claim 3, wherein the distance of the main photo spacers located in the edge area of the CF substrate from the arc edges of the expanded sections is 12 µm, 14 µm, or 16 µm.

5. A curved liquid crystal display panel, comprising a thin-film transistor (TFT) array substrate, a color filter (CF) substrate opposite to the TFT array substrate, an enclosure resin connecting and sealing between the TFT array substrate and the CF substrate, and a liquid crystal layer arranged between the TFT array substrate and the CF substrate;

the CF substrate comprising a transparent substrate, a plurality of pixel zones arranged on the transparent substrate in a manner of being spaced from each other, a black matrix arranged on the transparent substrate and located between the plurality of pixel zones, and a plurality of main photo spacers and a plurality of sub photo spacers arranged on the black matrix;

the black matrix comprising a plurality of longitudinally-arranged and laterally-arranged light-shielding strips and a plurality of expanded sections formed on two sides of the light-shielding strips, the plurality of main photo spacers and the plurality of sub photo spacers being arranged in a central area of light-shielding strips to be spaced from each other in an extension direction of the light-shielding strip, the plurality of expanded sections being arranged on the two sides of the light-shielding strips to respectively correspond to the plurality of main photo spacers, the expanded sections located in an edge area of the CF substrate having an area that is greater than an area of the expanded sections located in the central area of the CF substrate;

wherein the light-shielding strips of the black matrix that are located in the edge area of the CF substrate have a width that is less than a width of the light-shielding strips of the black matrix that are located in the central area of the CF substrate.

6. The curved liquid crystal display panel as claimed in claim 5, wherein the expanded sections each comprise an arc edge, the arc edges defining boundaries of the expanded sections of the black matrix and the pixel zones.

7. The curved liquid crystal display panel as claimed in claim 6, wherein a distance of the main photo spacers that are located in the central area of the CF substrate from the arc edges of the expanded sections is 10 µm and a distance of the main photo spacers located in the edge area of the CF substrate from the arc edges of the expanded sections is greater than 10 µm.

8. The curved liquid crystal display panel as claimed in claim 7, wherein the distance of the main photo spacers located in the edge area of the CF substrate from the arc edges of the expanded sections is 12 µm, 14 µm, or 16 µm.

9. A curved liquid crystal display panel, comprising a thin-film transistor (TFT) array substrate, a color filter (CF) substrate opposite to the TFT array substrate, an enclosure resin connecting and sealing between the TFT array substrate and the CF substrate, and a liquid crystal layer arranged between the TFT array substrate and the CF substrate;

the CF substrate comprising a transparent substrate, a plurality of pixel zones arranged on the transparent substrate in a manner of being spaced from each other, a black matrix arranged on the transparent substrate and located between the plurality of pixel zones, and a plurality of main photo spacers and a plurality of sub photo spacers arranged on the black matrix;

the black matrix comprising a plurality of longitudinally-arranged and laterally-arranged light-shielding strips and a plurality of expanded sections formed on two sides of the light-shielding strips, the plurality of main photo spacers and the plurality of sub photo spacers being arranged in a central area of light-shielding strips to be spaced from each other in an extension direction of the light-shielding strip, the plurality of expanded sections being arranged on the two sides of the light-shielding strips to respectively correspond to the plurality of main photo spacers, the expanded sections located in an edge area of the CF substrate having an area that is greater than an area of the expanded sections located in the central area of the CF substrate;

wherein the expanded sections each comprise an arc edge, the arc edges defining boundaries of the expanded sections of the black matrix and the pixel zones;

wherein a distance of the main photo spacers that are located in the central area of the CF substrate from the arc edges of the expanded sections is 10 μm and a distance of the main photo spacers located in the edge area of the CF substrate from the arc edges of the expanded sections is greater than 10 μm; and wherein the light-shielding strips of the black matrix that are located in the edge area of the CF substrate have a width that is less than a width of the light-shielding strips of the black matrix that are located in the central area of the CF substrate.

10. The curved liquid crystal display panel as claimed in claim 9, wherein the distance of the main photo spacers located in the edge area of the CF substrate from the arc edges of the expanded sections is 12 μm, 14 μm, or 16 μm.

* * * * *